March 10, 1964
HIROSHI KOJIMA ETAL
MICROSCOPE SYSTEM FOR USE WITH BOTH
INFRA-RED AND VISIBLE RAYS
Filed Oct. 4, 1961
3,124,682
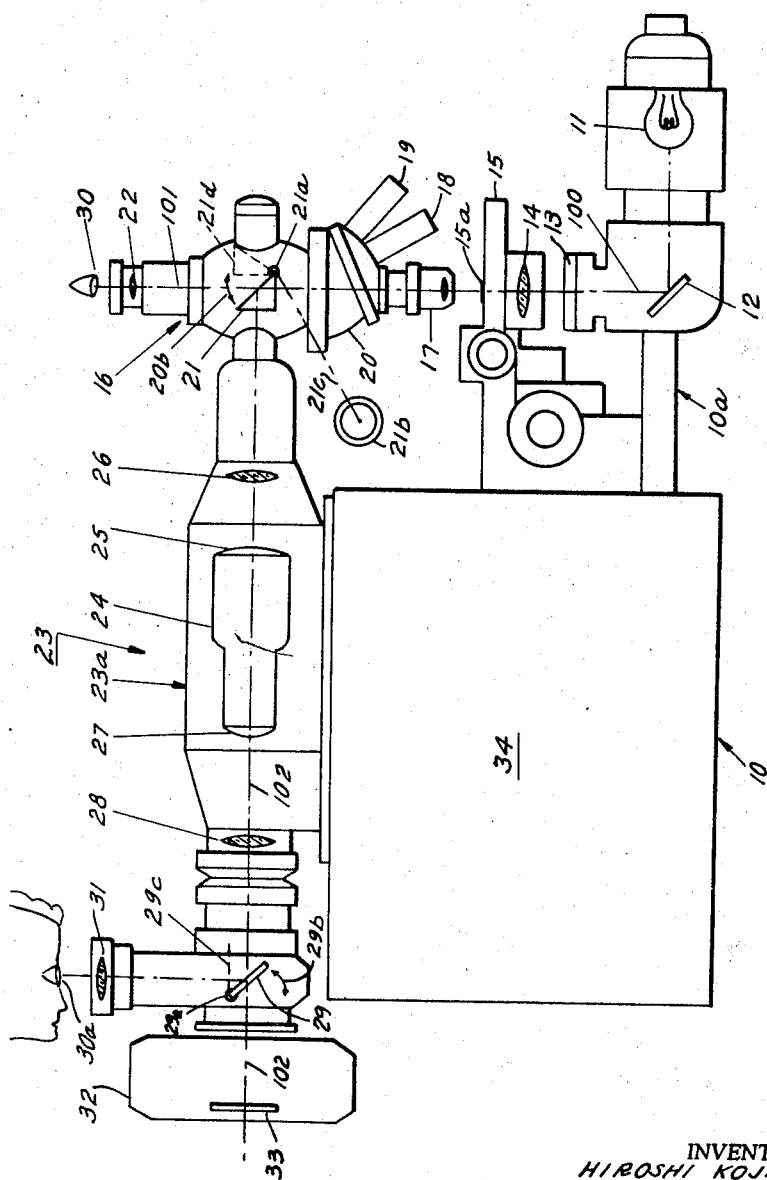
INVENTORS
HIROSHI KOJIMA
AKIO KASAHARA
BY SUSUMU SARUTA
OSTROLENK, FABER, GERB. & SOFFEN
ATTORNEYS

United States Patent Office 3,124,682
Patented Mar. 10, 1964

3,124,682
MICROSCOPE SYSTEM FOR USE WITH BOTH INFRA-RED AND VISIBLE RAYS
Hiroshi Kojima, Akio Kasahara, and Susumu Saruta, all of Tokyo, Japan, assignors to Nippon Electric Company, Limited, Tokyo, Japan
Filed Oct. 4, 1961, Ser. No. 142,943
Claims priority, application Japan Oct. 6, 1960
6 Claims. (Cl. 250—65)

This invention relates to microscopes and more particularly to a microscope system for use with both infra-red and visible rays, which system employs an image tube (image converter tube) sensitive to infra-red rays.

One of the methods presently used for observation of infra-red rays consists of the use of "infra-red rays film," which film is treated with a special dye stuff sensitive to infra-red rays. Film of this type has extremely short useful life and is adversely affected by changes in temperature so that it is very difficult to preserve for long periods of time. In addition, the film has very limited sensitivity and effective wave-length, making the use of the film extremely difficult. Moreover, since the infra-red image is invisible, the infra-red camera must be first focused on the visible image and equipped with an infra-red filter after which the focus travel must be adjusted for the infra-red rays in order to make an infra-red photograph. It can therefore be seen that the steps required for observation in the infra-red spectrum are quite tedious, especially if the material or specimen being examined has specific transmission absorption and reflection coefficients which are in the visible range and are photographed in the infra-red zone, thus forcing the camera to be brought into focus blindly. A situation such as this has consequently compelled the operator to employ the inefficient method of determining the required information from the photograph by a mere guess.

The microscope system of the instant invention is adapted to enable the operator to take an infra-red photograph while looking straight upon the visible image by utilization of an image tube which converts the infra-red image by means of a photo-electric conversion arrangement contained within the image tube. At the same time the microscope system can also be used in the normal manner for observing visible rays by the performance of a simple change-over operation.

The instant invention is comprised of an optical microscope system for observing a specimen placed adjacent thereto by means of an eye piece. A prismatic member is movably mounted within the optical microscope system for the purpose of passing rays from the specimen being examined to the eye-piece for visible observation when in the first position and for deflecting these rays away from the eye-piece and towards an infra-red ray observation means when moved from the first to a second position. The infra-red ray observation means consists of an image tube which is adapted to convert an infra-red image to a visible image which tube is positioned so as to have the rays deflected by means of the prismatic member upon its photo-electric surface which is sensitive to infra-red rays. The photo-electric material emits electrons which are accelerated and focused so as to bombard a fluorescent screen for producing a visible image of the specimen being examined. A photographing means is positioned adjacent the image tube for photographing the visible image of the infra-red ray image in order to produce a permanent picture thereof.

The second prismatic member is movably mounted adjacent the image tube fluorescent viewing screen. A second eye-piece is provided which is mounted at right angles to the image tube and photographing means. The prismatic member, when moved to a first position, deflects rays emanating from the image tube away from the photographing means and towards the eye-piece so as to permit visible observation thereof. When the second prismatic member is moved from the first position to a second position the rays emanating from the image tube are permitted to pass through to the photographing apparatus in order to produce a permanent photographic record thereof.

It is therefore a primary object of this invention to provide a microscope system which is so arranged as to permit observation of both the infra-red image and the visible image of a single specimen.

Another object of this invention is to provide a microscope system for observation of both infra-red and visible images of the same specimen wherein the system is adapted to provide means for both visually observing and photographing the infra-red image.

Another object of this invention is to provide a microscope system for observation of both visible and infra-red rays wherein the infra-red rays may be visually observed by the employment of an image ray tube.

Another object of this invention is to provide a microscope system for the observation of both visible and infra-red rays wherein a single lens system is employed for the focusing for both infra-red and visible rays in order therefore to facilitate the focusing operation.

These and other objects will become apparent when reading the following description in connection with the drawing, in which:

The single figure shows an elevational view of the microscope system.

Referring now to the drawing, the single figure shows a microscope system generally designated as 10 which includes an illuminating source 11, such as for example, an incandescent lamp, for the purpose of illuminating the specimen to be observed. A reflector member 12 is positioned within the microscope system housing 10a in order to reflect the rays emanating from the illuminating source 11 in an upward vertical direction wherein the reflected and incident rays are schematically represented by phantom line 100. An infra-red filter 13 is positioned in the path of the rays 100 and a condensing lens 14 which is mounted beneath a specimen stage 15 of the microscope system 10 is employed for focusing the infra-red rays passing through the infra-red filter 13 upon the material or specimen to be observed 15a which is positioned upon the specimen stage 15.

An optical microscope system 16 is positioned above the specimen 15a and consists of three objective lens systems, 17, 18 and 19 which can be suitably switched into the operative position by means of the revolver or turret 20. As shown in the figure objective lens 17 is aligned for focusing the rays 100 passing therethrough. An eye-piece 22 is provided for observing the visible image of the specimen 15a by the naked eye shown at 30.

A prismatic member 21, which is arranged to pivot about a pivot point 21a in the directions shown by arrows 21e, is provided within the optical microscope system 16 for the purpose of deflecting the rays 100 directed vertically upward, towards the horizontal direction, as shown schematically at 102, when the prismatic member is in the position shown by the solid representation 21. When the prismatic member is rotated clockwise into the position shown by the dotted representation 21d, the vertically upward rays 100 are permitted to pass beyond the prism 21d and pass through the eyepiece 22 as shown schematically by the phantom line 101. The movement of prismatic member 21 is controlled by the manually operable control knob 21d which is mechanically linked to prismatic member 21 as shown schematically by the dashed line 21c.

The infra-red image viewing portion 23 of the microscope system 10 is comprised of a housing 23a joined to the optical microscope system 16, so as to have the horizontally directed rays 102 pass therethrough when the prismatic member is in the position shown in the solid line form 21. The image of the specimen 15a formed by the objective lens arrangement 17 is focused by means of a secondary objective lens 26. The rays 102 passing through the objective lens 26 impinge upon the photoelectric surface 25 of an image tube 24. The photoelectric surface is sensitive to infra-red rays so as to cause photoelectrons to be emitted therefrom in proportion to the intensity of the infra-red image formed upon the surface 25. These photoelectrons emitted are accelerated and focused so as to bombard a fluorescent screen 27 at the opposite end of image tube 24 by means of an internal electrode arrangement (not shown). The fluorescent screen 27 due to the bombardment thereof of photoelectrons, generates a visible image of the specimen 15a which is focused by proximity lens 28. The focused rays passing through proximity lens 28 impinge upon a reflector member 29 pivotally mounted at pivot point 29a for reflecting the rays incident thereupon vertically upward and through an eye-piece 31 for visible observation by the naked eye 30. The reflector member 29 which is adapted for rotation in either the clockwise or counterclockwise direction as shown by arrows 29b, permits, upon movement to the horizontal position shown by the dashed line 29c, passage of the rays 102 through camera 32 so as to impinge upon photographic plate 33 for photographically recording the visible image which has been converted from the infra-red image. The block 34 represents the housing for the energy sources (not shown) necessary for illumination of the lamp 11 and the image tube 24.

In operation, the microscope system is focused for visual observation by the naked eye 30 by rotating the prismatic member clockwise to the position shown as 21d so as to permit rays to pass through eye-piece 22 for observation by the eye 30. After proper focusing, prismatic member 21 is rotated counter-clockwise to the position shown by solid line 21 for deflecting rays horizontally as shown in 102 through objective lens 26 so as to impinge upon image tube 24. Image tube 24 being sensitive to infra-red rays, as previously described, converts the infra-red image to a visible image at screen 27 of tube 24 to enable observation by the naked eye 30 through eye-piece 31 when reflector member 29 is in the solid line position shown at 29 and further for the photographing of the visible representation of the infra-red image by moving the reflector member counter-clockwise to the position shown at 29c to permit the rays to pass through camera 32 and to impinge upon photographic plate 33. With the photo-electric conversion unit which includes the image tube 24 positioned horizontally upon the power source 34 and the microscope optical system 16 arranged vertically, the microscope system 10 based upon this new design can be very easily operated. Thus such defects as the complication in construction and the difficulty which would often be found in multi-purpose microscopes, have been alleviated.

Since the image tube 24 is also sensitive to ultra-violet rays, the microscope system 10 may also be employed for ultra-violet ray use when the suitable optical system is employed therein.

It can therefore be seen that we have provided a microscopic system for the observation of infra-red, as well as visible, images wherein the focusing and thus the entire operation has been considerably simplified.

The features and principles underlying the invention described above in connection with specific exemplifications thereof will suggest to those skilled in the art many other modifications thereof. It is accordingly desired that the appended claims shall not be limited to any specific features or details described in connection with the exemplifications thereof.

It is claimed:

1. A microscope system for observing both visual and infra-red rays emanating from a specimen comprising first means for focusing rays emanating from said specimen, second means for viewing infra-red rays emanating from said specimen, said second means including means sensitive to infra-red rays for converting said rays into visible rays; said first means including an eye-piece for observing visible rays and deflecting means pivotally mounted in said first means for deflecting rays from said specimen away from said eye-piece and towards said second means when in a first position; manually operable means operatively connected to said deflecting means for rotating said deflecting means from said first position enabling rays emanating from said specimen to pass through said eye-piece for observance of said visible rays enabling the usable light wavelength range of said microscope system to be greatly expanded.

2. A microscope system for observing both visual and infra-red rays emanating from a specimen comprising first means for focusing rays emanating from said specimen, second means for viewing infra-red rays emanating from said specimen, said second means including means sensitive to infra-red rays for converting said rays into visible rays; said first means including an eye-piece for observing visible rays and deflecting means pivotally mounted in said first means for deflecting rays from said specimen away from said eye-piece and said second means when in a first position; manually operable means operatively connected to said deflecting means for rotating said deflecting means from said first position enabling rays emanating from said specimen to pass through said eye-piece for observance of visible rays enabling the usable light wavelength range of said microscope system to be greatly expanded; said deflecting means being a prism.

3. A microscope system for observing both visual and infra-red rays emanating from a specimen comprising first means for focusing rays emanating from said specimen, second means for viewing infra-red rays emanating from said specimen, said second means including means sensitive to infra-red rays for converting said rays into visible rays; said first means including an eye-piece for observing visible rays and deflecting means pivotally mounted in said first means for deflecting rays from said specimen away from said eye-piece and towards said second means when in a first position; manually operable means operatively connected to said deflecting means for rotating said deflecting means from said first position enabling rays emanating from said specimen to pass through said eye-piece for observance of visible rays enabling the usable light wavelength range of said microscope system to be greatly expanded; said second means including an image ray tube.

4. A microscope system for observing both visual and infra-red rays emanating from a specimen comprising first means for focusing rays emanating from said specimen, second means for viewing infra-red rays emanating from said specimen, said second means including means sensitive to infra-red rays for converting said rays into visible rays; said first means including an eye-piece for observing visible rays and deflecting means pivotally mounted in said first means for deflecting rays from said specimen away from said eyepiece and towards said second means when in a first position; manually operable means operatively connected to said deflecting means for rotating said deflecting means from said first position enabling rays emanating from said specimen to pass through said eye-piece for observance of visible rays enabling the usable light wavelength range of said microscope system to be greatly expanded; photographing means positioned to photograph the converted infra-red image from said image ray tube.

5. A microscope system for observing both visual and infra-red rays emanating from a specimen comprising first means for focusing rays emanating from said specimen, second means for viewing infra-red rays emanating from said specimen, said second means including means sensitive to infra-red rays for converting said rays into visible rays; said first means including an eye-piece for observing visible rays and deflecting means pivotally mounted in said first means for deflecting rays from said specimen away from said eye-piece and towards said second means when in a first position; manually operable means operatively connected to said deflecting means for rotating said deflecting means from said first position enabling rays emanating from said specimen to pass through said eye-piece for observance of visible rays enabling the usable light wavelength range of said microscope system to be greatly expanded; photographing means positioned to photograph the converted infra-red image from said image ray tube; a second eye-piece, second deflecting means pivotally mounted adjacent said image ray tube; said second deflecting means being adapted to deflect rays emanating from said image ray tube away from said photographing means and towards said second eye-piece when in a first position; second manually operable means for moving said second deflecting means from said first position to enable the rays emanating from said image ray tube to pass to said photographing means.

6. A microscope system for observing both visual and infra-red rays emanating from a specimen comprising first means for focusing rays emanating from said specimen, second means for viewing infra-red rays emanating from said specimen, said second means including means sensitive to infra-red rays for converting said rays into visible rays; said first means including an eye-piece for observing visible rays and deflecting means pivotally mounted in said first means for deflecting rays from said specimen away from said eye-piece and towards said second means when in a first position; manually operable means operatively connected to said deflecting means for rotating said deflecting means from said first position enabling rays emanating from said specimen to pass through said eye-piece for observance of visible rays enabling the usable light wavelength range of said microscope system to be greatly expanded; photographing means positioned to photograph the converted infra-red image from said image ray tube; a second eye-piece, second deflecting means pivotally mounted adjacent said image ray tube; said second deflecting means being adapted to deflect rays emanating from said image ray tube away from said photographing means and towards said second eye-piece when in a first position; second manually operable means for moving said second deflecting means from said first position to enable the rays emanating from said image ray tube to pass to said photographing means; said first means being adapted to focus the rays from said specimen to produce a sharp image of said specimen in both said visible and said infra-red viewing means.

References Cited in the file of this patent

UNITED STATES PATENTS

| | | |
|---|---|---|
| 2,874,300 | Van Alphen et al. | Feb. 17, 1959 |
| 2,970,220 | Bouwers | Jan. 31, 1961 |
| 2,974,573 | Faasch | Mar. 14, 1961 |